United States Patent [19]
Noon

[11] Patent Number: 4,741,104
[45] Date of Patent: May 3, 1988

[54] CUTTING TOOL FOR TUBES

[75] Inventor: Laurence Noon, Saskatoon, Canada

[73] Assignee: Northern Telecom Limited, Montreal, Canada

[21] Appl. No.: 25,246

[22] Filed: Mar. 12, 1987

[51] Int. Cl.⁴ ............................................. B21F 13/00
[52] U.S. Cl. ..................................... 30/90.4; 30/91.1; 81/9.41
[58] Field of Search .............................. 30/90.4–91.1, 30/301–304; 81/9.41

[56] References Cited

U.S. PATENT DOCUMENTS 4,631,059  12/1986  Wolvek et al. ................. 30/90.4 X

FOREIGN PATENT DOCUMENTS 22764   12/1948  Finland ................................. 30/299
2493618  5/1982  France ................................. 30/90.4

Primary Examiner—Douglas D. Watts
Attorney, Agent, or Firm—R. J. Austin

[57] ABSTRACT

A cutting tool in which a tool holder has a through passageway for acceptance of a tube. Cutting blades entered into the holder at circumferentially spaced positions to provide longitudinal cuts in the tube. Useful for small size tubes, e.g. those used in optic cable to house optic fibers.

4 Claims, 2 Drawing Sheets

CUTTING TOOL FOR TUBES

This invention relates to a cutting tool for tubes and to a method of cutting tubes.

Optical cables comprise at least one optic fiber which is surrounded by some protective medium. In some optical cable constructions, the protective medium comprises a tube of plastics or other material and the optical fiber or fibers are housed within the tube. The tube and optical fiber assembly may be assembled together with tensile strength members in the cable and surrounded by a protective shield and jacket.

In use, it is sometimes necessary to remove a part of the length of a tube surrounding optical fibers either at the tube ends for splicing the ends of the fibers to fibers of another cable, or over a section of the tube spaced from its ends in a case where a branch splicing operation is to be performed. The removal of the tube in these circumstances may be difficult.

The present invention seeks to provide a cutting tool and a method for cutting a tube which alleviates the cutting problems involved.

According to one aspect of the present invention, a cutting tool is provided for cutting into a tube in which the tool comprises a cutter blader holder for defining a through passageway for acceptance of the tube and for relative movement of the tube and holder axially of the passageway, and two cutting blades extending from the holder into the passageway at positions circumferentially spaced around the passageway, the blades having cutting edges oriented to cut along the tube during said relative movement.

In use of the cutting tool, the blades are caused to move along the tube in circumferentially spaced positions so as to provide two axially extending cuts over the required distance. A section of the tube may then be removed, or alternatively in a case where the blades are diametrically opposed across the tube, the tube is cut into two halves along the length of the tube under consideration. The cutting tool may have a body formed from a single component with the passageway extending through the single component and the two cutting blades are mounted so as to extend into the passageway by being held by the single component. Preferably however, the tool comprises two holder parts each of which define a circumferential portion of the passageway and these parts are relatively locatable in a closed position in which they confront each other around the passageway. Preferably also the holder parts are hinged together about an axis which is spaced from and extends substantially parallel to the axis of the passageway, the holder parts being relatively movable between closed and open positions. Ideally the holder parts are identical in shape with each part having a body extending axially of the passageway and a plurality of hinge portions which extend laterally from the body in axially spaced poitions. These two holder parts are assembled together with their hinge positions intermeshed. Also it is convenient to have the cutting blades spaced apart axially of the passageway. In this arrangement, each cutting blade may then urge the tube laterally into contact with the opposite side of the passageway which then acts as a supporting bolster for the tube during the cutting operation.

According to a further aspect of the invention, a method is provided for removing a tube from around optic fibers housed therein comprising disposing the tube within a passageway of a cutting tool with two cutting blades of the tool contacting the tube at circumferentially spaced positions around the tube, and relatively moving the tube and cutting tool axially of the passageway to cause the cutting blades to cut through the tube at the two positions, progressively axially along the tube.

One embodiment of the invention will now be described, by way of example, with reference to the accompanying drawings, in which.

Figure 1:
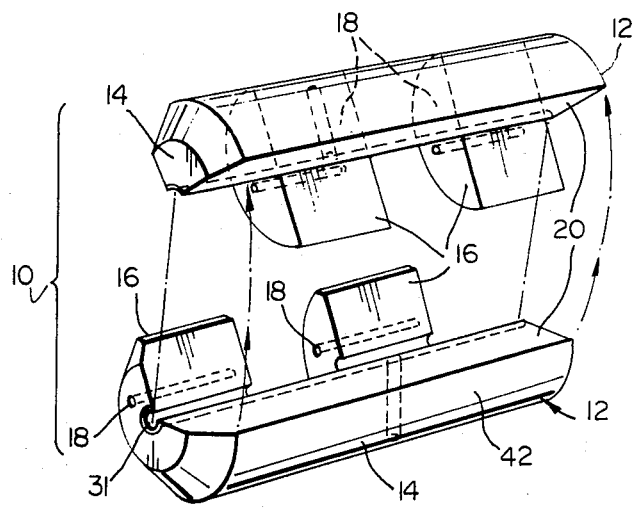
FIG. 1 is an isometric exploded view of parts of a cutting tool.

A cutting tool 10 for cutting tubes containing optical fibers of an optical fiber cable has a cutter blade comprising two holder parts 12 as shown in FIG. 1. Each part 12 is formed from a readily moldable plastics material which is rigid in its molded form. Any suitable material may be used for this purpose, for instance nylon or high density polyethylene.

Figure 2:
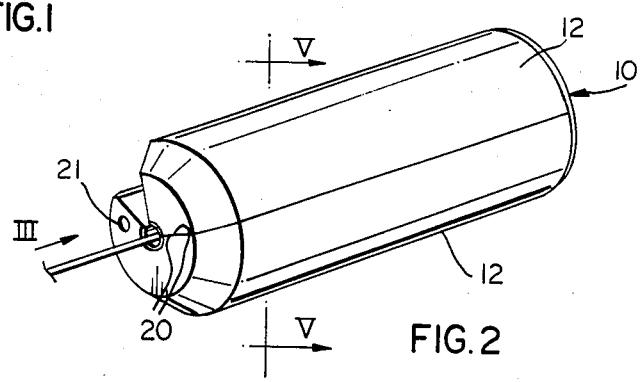
FIG. 2 is a view similar to FIG. 1 and showing the parts fitted together with the tool in a closed position.
Figures 3, 4:
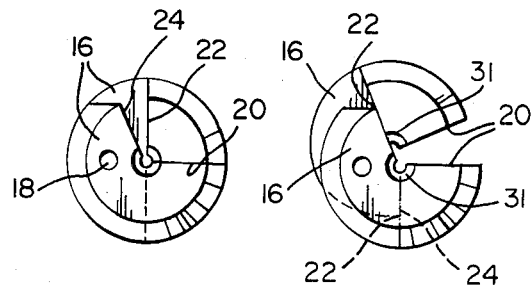
FIG. 3 is an end view in the direction of arrow III in FIG. 2 of the cutting tool.
FIG. 4 is a view similar to FIG. 3 but showing the cutting tool in an open position.

As shown by FIG. 1, each holder part 12 comprises a body 14 which, in cross-section, is substantially a cylindrical quadrant. Each body 14 is molded integrally with two hinge portions 16 which extend laterally from the body so as to continue following the cylindrical shape of the body, the angle subtended by the body and each of the hinge portions 16 being approximately 250° around an axis of the cylinder. As shown, the two hinge portions are axially spaced apart along each body, the distance between the hinge portions being suitable to slidably accommodate a hinge portion of the other body. Hinge portions of each of the holder parts are formed with axially aligned hinge pin apertures 18 with the axis lying along the plane of a radial face 20 of the cylindrical quadrant shaped body 14. As can be seen from FIGS. 1 and 2, the two parts 12 are assembled together by overlying the parts with the parts in reversed positions so that the hinge portions intermesh and the hinge apertures 18 are axially aligned. A hinge pin 21 (FIG. 2) then holds the holder parts in assembled condition in which they are relatively movable around the hinge pin. As shown by FIGS. 2 and 3 the holder may be in a closed condition in which the two holder parts 12 are relatively pivoted until their opposing faces 20 lie substantially in overall face-to-face engagement. To open the holder, the parts are relatively moved into or towards relative positions shown in FIG. 4 in which the faces 20 are moved apart and another radial face 22 of each body 14 has moved into engagement with a radial face 24 of a hinge part 16. In the closed condition of the holder, there is a small angle between opposing surfaces 22 and 24. Because of this, then in the fully open condition, a small space 26 is provided between the faces 20, and because of the small size of the cutting tool, it is impossible for a user to contact cutting tools (to be described) with his fingers during operation.

Figure 5:
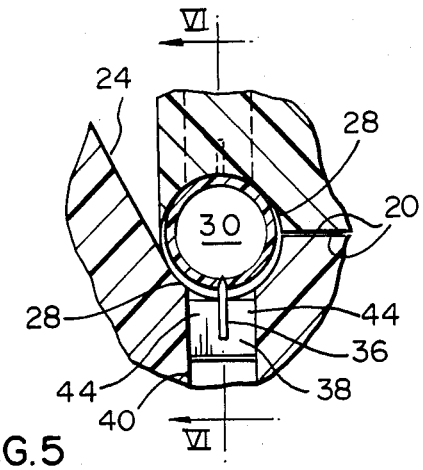
FIG. 5 is an enlarged cross-sectional view of part of the cutting tool in a closed position taken along line V—V in FIG. 2.

The two holder parts are formed with part cylindrical surfaces 28 (FIGS. 5 and 6) at the center of the assembly where the faces 20, 22 and 24 converge, and these surfaces 28, in the closed condition of the holder, form a substantially cylindrical passageway 30 which extends through the holder and is coaxial with it, so that each body 14 extends axially of the passageway. Each end 31 of each surface 28 is chamfered (see FIGS. 1 and 4) to enable a tube to be fed easily into the passageway for cutting purposes.

Each holder part is provided with a cutting blade 32 (see particularly FIGS. 5 and 6) and each cutting blade 32 is orientated so as to cut along the tube after insertion of the tube into the passageway and during relative movement of the tube and cutting tool axially of the passageway. As shown in the Figures, each cutting blade 32 is principally a flat blade having a chevron-shaped cutting edge 34. Each cutting blade is mounted in its holder part by being held within a slot 36 of a resilient plastic holder 38 which is a force fit into a radially extending aperture 40, formed through a body portion 14 between the surface 28 and the outer cylindrical surface 42 of the body. The resilient nature of the holder 38 is such that two arms 44 defining the slot 36 are urged together by contact with the walls of aperture 40 so as to grip the sides of the blade 32 securely and prevent any movement within the holder part. As can be seen from FIGS. 5 and 6, the two blades are disposed with their chevron-shaped cutting edges extending into the passage 30 and the blades are located in diametrically opposed positions across the passageway while being axially displaced from one another along the passageway.

Figure 6:
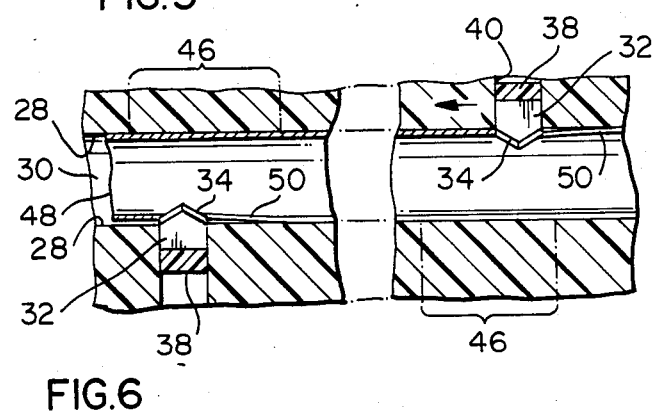
FIG. 6 is a cross-sectional view taken along the axis, i.e. along line VI—VI in FIG. 5 and to the same scale.
Figure 7:
FIG. 7 is an isometric view of the end of a tube which has been cut by the apparatus of the embodiment.

In use of the cutting tool, if a tube 46 requires cutting from one end (for instance as shown in FIG. 7) then the tube may be inserted into an end of the passageway or may be accepted into the passageway laterally. In the latter case, the blade holder is held in an open position as shown in FIG. 4 to enable the tube to be moved laterally between faces 20. With the tube located in the passageway 30, the holder parts are returned to their closed position (FIGS. 2, 3 and 5) and during this movement, the cutting edge 34 of each of the blades 32 is forced into and through the material of the tube. In this particular embodiment, each of the blades 32 projects approximately 0.015 inches into the passageway and the tube accommodated in the passageway is slightly smaller in diameter than the diameter of the passageway. While the difference in diameters is ideally about 0.005 inches to restrict any lateral movement of the tube, the construction and operation of the device is such that tubes of different diameters within certain limits may be cut within the tool. Allowance for a range of tube diameters is made possible because of the axial displacement of the cutting blades. As can be seen from FIG. 6, because the cutting blades are spaced axially apart then each cutting blade acts directly against the wall of the tube thereby forcing the tube laterally into forced contact with the diametrically opposite part of the passageway surface indicated at 48 at the two positions in FIG. 6. The diametrically opposite part of the passageway acts as a bolster to the tube to support it during the cutting operation. This support would not be possible if the two cutting blades were at the same axial position in the tool. As support is provided by the passageway for cutting operation by each blade, and as each blade projects a certain distance into the passageway 30, then variations in tube diameter will make no difference to the cutting operation which will not adversely affect the cutting operation. As shown by FIG. 6, each of the chevron-shaped cutting edges 34 extends at a low angle to the direction of movement of the cutting blades along the tube. This low angle is to ensure that the cutting blade provides a strong radial force to the tube, in addition to the axial force required for cutting, so as to ensure a positive movement of the tube laterally into its forceful engagement with the passageway surface as discussed.

The chevron-shaped blades enable cuts to be made by moving the tool in either direction. As can be seen from FIG. 6, the cutting tool is moving from right to left upon a stationary tube 46. During this movement, each cutting blade 32 is in the process of forming a cut 50 which, as shown by the Figure, trails behind the cutting edge, i.e. it lies to the right-hand side of the blade. Thus as the tool moves along the tube it forms diametrically opposite cuts 50 through the tube to divide the tube substantially into halves.

The cutting tool may be used to form two cuts 50 at the ends of a tube 48. The two sections of tube lying at the sides of the cuts are then removed by a circumferential cut shown by chain-dotted line 52 in FIG. 7, so as to expose the ends of the optical fibers 54 for splicing purposes.

Figure 8:
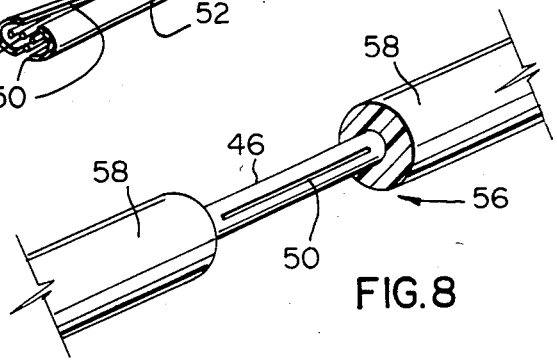
FIG. 8 is an isometric view of part of an optical cable and showing an exposed tube which has been cut by using the tool of the embodiment.

Alternatively, the cutting tool may be used to provide two cuts 50 (one only being shown) along a length of tube 46 between its ends. This is shown in FIG. 8 in which a mid-section of cable 56 has the surrounding material, e.g. jacket and shield 58 removed over a certain section and then the cutting tool is applied to the tube by passage of the tube between the faces 20 with the tool in the open position. Once the cuts 50 have been made then the section of tube bordering the cuts may be removed to enable a splicing operation to be performed.

What is claimed is:

1. A cutting tool for cutting into a tube comprising a cutter blade holder comprising:

two holder parts which are relatively locatable in an open position and alternatively in a closed position in which they confront each other for defining a through passageway for acceptance of the tube and for relative movement of the tube and holder axially of the passageway with each holder part defining a circumferential portion of the passageway; and two cutting blades extending one from each holder part into the passageway at positions spaced around the passageway, the blades having cutting edges oriented to cut along the tube during said relative movement;

the holder parts being identical in shape with each part having a body extending axially of the passageway and a plurality of hinge portions which extend laterally from the body in axially spaced positions, and the two holder parts are assembled together with their hinge portions intermeshed to hinge the holder parts together about an axis spaced from and extending substantially parallel to the axis of the passageway to permit relative hinging movement of the holder parts between the open and closed positions.

2. A cutting tool according to claim 1 wherein the cutting blades are spaced axially of the passageway.

3. A method of removing a tube from around optic fibers housed therein comprising disposing the tube within a passageway of a cutting tool by relatively moving two identical cutter blade holder parts into a closed position to form the passageway, the holder parts extending along the passageway and being hingedly moved into the closed position, one upon the other, about a hinge axis spaced from and extending substantially parallel to the axis of the passageway, the hinge axis provided by intermeshed hinge portions of the holder parts which extend laterally from bodies of the holder parts, two cutting blades of the tool contacting the tube at circumferentially spaced positions around the tube in the closed position of the cutting tool, and relatively moving the tube and cutting tool axially of the passageway to cause the cutting blades to cut through the tube at the two positions progressively axially of the tube.

4. A method according to claim 3 wherein the cutting blades are also spaced axially of the tube and as each blade cuts the tube, the blade urges the tube laterally so that it is supported at a position diametrically opposite the blade by the surface of the passageway.

* * * * *